US 6,625,002 B2

United States Patent
Ramakrishnan et al.

(10) Patent No.: US 6,625,002 B2
(45) Date of Patent: Sep. 23, 2003

(54) SYSTEM AND METHOD FOR LIMIT SENSING OF GAPS BETWEEN SURFACES DURING OPTICAL COMPONENT CONFIGURATION (75) Inventors: Srikanth Ramakrishnan, Nepean (CA); Krassimir Stoev, Ottawa (CA); Dusan Ivancevic, Ottawa (CA)

(73) Assignee: JDS Uniphase Inc., Ottawa (CA)

( * ) Notice: Subject to any disclaimer, the term of this patent is extended or adjusted under 35 U.S.C. 154(b) by 74 days.

(21) Appl. No.: 09/902,682

(22) Filed: Jul. 12, 2001

(65) Prior Publication Data
US 2002/0167778 A1 Nov. 14, 2002

Related U.S. Application Data
(60) Provisional application No. 60/289,796, filed on May 10, 2001.

(51) Int. Cl.[7] ............................................. H01H 47/12
(52) U.S. Cl. ........................................ 361/203; 385/147
(58) Field of Search .................................. 361/170, 179, 361/187, 143.147, 152.154, 203; 307/117, 128, 130; 385/52, 146–147, 95–99

(56) References Cited

U.S. PATENT DOCUMENTS 5,596,672 A * 1/1997 Harman et al. ............. 385/147

6,239,516 B1 * 5/2001 Floresta et al. ............. 310/12

* cited by examiner

Primary Examiner—Brian Sircus
Assistant Examiner—Boris Benenson
(74) Attorney, Agent, or Firm—Neil Teitelbaum (57) ABSTRACT

An important consideration in making a fiber optic device (e.g., comprising fiber in a polished tube at a certain angle and GRIN lens) is to limit sense, maintain and/or measure the gap-width between these two polished surfaces before they are either fused or glued for optimum performance. In automating the configuration, the gap is sensed, apart from optimizing in the transverse plane to minimize the loss. In the present application, a limit sensing method and system is provided to improve the effectiveness in automated manufacturing systems, by exploiting the electromechanical properties of induced EMF (Electro-Magnetic Force) by an electrical coil in presence of a magnet at mechanical resonance. Once it is known when two optical surfaces to be glued are said to have zero gap (i.e., contact between the surfaces), the present system provides an annunciation from limit-sensing electronics. Afterwards, it is easier to back-off (separate the surfaces) up to maintain a gap using a micrometer, manually or by a stepper motor longitudinally.

37 Claims, 10 Drawing Sheets

SYSTEM AND METHOD FOR LIMIT SENSING OF GAPS BETWEEN SURFACES DURING OPTICAL COMPONENT CONFIGURATION

This application claims priority from US Provisional Application No. 60/289,796, filed May 10, 2001.

FIELD OF THE INVENTION

The present invention relates generally to the configuration of optical component assemblies, and in particular to systems and methods for limit sensing, gap maintenance and gap measurement between surfaces such as in polished optical surfaces used in fiber collimators.

BACKGROUND OF THE INVENTION

Optical fiber has become increasingly important in many applications involving the transmission of light. Light transmitted through a fiber is subjected to different types of optical interactions to filter, modulate, split, combine or otherwise act on the light. In many cases one or more fibers are led into an enclosure operating as an optical system. The input light entering the enclosure, usually but not always on one fiber, interacts with some optical device within the enclosure, and the resulting light exits the enclosure via one or more fibers. An example of such a two-port system is an optical isolator in which two polarizers sandwiching a Faraday rotator are positioned between two fibers that have collimating lenses adjacent their free ends. The polarization angles are set such that light can propagate in one direction through the isolator but is prevented from propagating in the opposite direction. Another example is a dielectric interference filter that transmits or reflects selected wavelengths.

In practice, the fibers used in such optical systems are typically held in collimator assemblies that are easily aligned to the enclosure of the optical system. A commercial collimator includes as its most fundamental components the fiber, a small glass tube (also referred to as a capillary) that holds the exposed fiber end, and a graded index (GRIN) lens. A GRIN type lens used with optical fiber is generally a cylindrical piece of optical glass with a length longer than its diameter. It is fabricated to have a radially varying index of refraction that is greater towards the center, with the result being that it produces a focusing effect similar to a convex lens. The fiber is held in the collimator assembly by a cylindrical ferrule (this ferrule fiber holder is further referred as a glass tube). The distance (i.e. gap) between the fiber end and the GRIN lens is critical for collimation. Once this distance has been set, the fiber and the GRIN lens are fixed together, for example by epoxy or by laser welding, to maintain the desired collimation. The fixed displacement between the fiber end and the GRIN lens should provide an optically well-characterized beam, and will result in minimum insertion loss of the optical system.

In the typical process of assembling a collimator, the GRIN lens is bonded to the glass tube (i.e., the holder of the fiber) with its angled (or faceted) side, while its plano side is facing outward (toward the next intermediate optical component). The fiber is received and held in constant position within the glass tube along its central axis, and the tube-fiber assembly is used for further alignment. Thereafter, the tube's positions (and hence the fiber's position) is varied or adjusted in respect to the GRIN lens position until some optimum condition is achieved. At that point, the tube is bonded to the GRIN lens. Gap sensing (or limit sensing) between the fiber end (i.e., tube end) and the GRIN lens is an important step in the manufacturing and calibration of optical components such as collimators discussed above.

Conventionally, the assembly and alignment (involving gap or limit sensing) of optical components have involved a long, tedious and labour-intensive operation. Conventional techniques include the use of cameras and complex image processing techniques, or ultrasound and strain gauge schemes to find "near touch" conditions. Further, other conventional systems involve the use of optical interferometers or back-reflection methods to determine when surfaces are parallel and used to measure gap width between the two surfaces.

SUMMARY OF THE INVENTION

In accordance with one aspect of the present invention there is provided a method for controlling a relative movement between faces of first and second optical components, one end face of the first optical component being faced with one end face of the second optical component, the method comprising the steps of: providing first attaching means, the first optical component being attached to the first attaching means; providing second attaching means, the second optical component being attached to the second attaching means, the first and second optical components attached to the respective attaching means being capable of relatively moving with a gap being defined between the two faces in a direction; providing an electromotive force (EMF) to cause the two optical components to relatively move in the direction, so that the faces of the two optical components are in proximity; detecting contact between portions of the faces of the two optical components; and separating the faces of the two optical components a predetermined amount.

In an exemplary embodiment, the step of detecting contact further includes the step of detecting a change to the vibration of the movable arm when the faces of the two optical components touch each other. For example, the step of detecting a change can include the following steps: obtaining a first AC voltage in response to the AC oscillation voltage; obtaining a second AC voltage induced from the current flowing in the coil; and processing the first and second AC voltages with reference to their electrical parameters to detect contact of portions of the faces of the two optical components.

In a further exemplary embodiment, the method includes the step of digitally detecting the resonant frequency. For example, the step of digitally detecting can include the following steps: providing a first digital data; providing an analog signal to the coil with reference to the first digital data, a current flowing in the coil in response to the analog signal; obtaining an induced analog voltage resulting from the flowing of the current in the coil; converting the induced analog voltage to a second digital data; and processing the first and second digital data to detect the resonant frequency with reference to the first and second digital data.

In a further exemplary embodiment, the step of providing a first data comprises the step of choosing the frequency of an sinusoidal input to the coil, the first digital data containing information of the chosen frequency; the step of converting comprises the step of digitizing the induced analog voltage, the second digital data containing frequency information of a digitized voltage; and the step of the processing comprises the steps of: (i) comparing the chosen frequency information of the first digital data and the frequency information of the second digital data; and (ii) in a case where a predetermined condition with the both frequencies is met, providing a new first digital data containing information of a newly chosen frequency.

In accordance with another aspect of the present invention there is provided a system for controlling a relative movement between faces of first and second optical components, one end face of the first optical component being faced with one end face of the second optical component, the system comprising: a first attachment body for attaching the first optical component thereto; a second attachment body for attaching the second optical component thereto, the first and second optical components attached to the respective attachment bodies being capable of relatively moving with a gap being defined between the two faces in a direction; an electromotive force (EMF) device for providing an EMF to cause the two optical components to relatively move in the direction, so that the faces of the two optical components are in proximity; means for detecting contact between portions of the faces of the two optical components; and means for separating the faces of the two optical components a predetermined amount.

In an exemplary embodiment, the system further comprising means for providing an AC oscillation voltage to the coil, wherein an AC current flows in the coil, so that the EMF vibrates the movable arm mechanically, the movable arm having a mechanical resonance. Contact is detected at a frequency of the resonance of the vibrating movable arm, the resonant frequency being varied when the faces of the two optical components touch each other.

In a further exemplary embodiment, the change of the resonant frequency is detected in response to the AC oscillation voltage and an induced AC voltage resulted from the current flowing in the coil, wherein with reference to parameters of the AC oscillation voltage and the induced AC voltage, so that from the detection of the resonant frequency change, contact of portions of the faces of the two optical components is detected.

In a further exemplary embodiment, the system includes a stepping motor for controlling the movement of the movable arm, the movement of the movable arm being further controlled in response to the detection of contact of portions of the two faces of the two optical components.

In a further exemplary embodiment, the system includes means for (i) providing a first digital data; (ii) providing an analog signal to the coil with reference to the first digital data, a current flowing in the coil in response to the analog signal; (iii) obtaining an induced analog voltage resulting from the flowing of the current in the coil; (iv) converting the induced analog voltage to a second digital data; (v) processing the first and second digital data to detect the resonant frequency with reference to the first and second digital data, wherein the resonant frequency is detected. The first digital data contains information of the chosen frequency of an sinusoidal input to the coil; and the second digital data contains frequency information of a digitized voltage derived from the induced analog voltage, the chosen frequency information of the first digital data and the frequency information of the second digital data being compared, so that in a case where a predetermined condition with the both frequencies is met, a new first digital data containing information of a newly chosen frequency is provided to perform a new detection of the resonant frequency.

In summary, according to exemplary embodiments of the present invention, the following are features are provided by the systems and methods described:

(a) Limit sensing of two optical surfaces in a manufacturing system involving electrical systems by exploiting mechanical resonance. Fine tuning support is provided by dithering a movable arm or flexure assembly by sending a sinusoidal current to a coil in presence of a magnetic field from a permanent magnet. The two optical surfaces whose gap is to be maintained are mounted on the flexure and a static arm.

(b) All three axes can have flexure-based moving arms to sense the gap.

(c) Independent of the material filled in the gap (e.g., water, alcohol and glue). Limit indication occurs when a portion of the two surfaces touch. The limit indication is independent of relative position of flexure and micrometer position.

(d) After limit sensing, maintaining a particular predetermined gap (i.e., separation between the two surfaces) is simplified. By variable dithering the gap between any two optical surfaces of a given device, measurement of gap is also possible.

(e) Since the mechanical dithering before the two optical surfaces touch drops drastically after the two surfaces touch, there is effectively no damage done to the optical surfaces. Also, the method and apparatus of the present invention is scalable—one can maintain mechanical dither in the sub-micrometer range.

(f) To measure gap along any direction, it is sufficient to dither in one of the axes.

(g) A separate sensor is not required to measure or sense the gap. The coil in a magnetic field is used to move and sense the gap.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Further features and advantages of the present invention will be described in the detailed description, taken in combination with the appended drawings, in which.

DETAILED DESCRIPTION OF EMBODIMENTS OF THE PRESENT INVENTION

Figure 1:
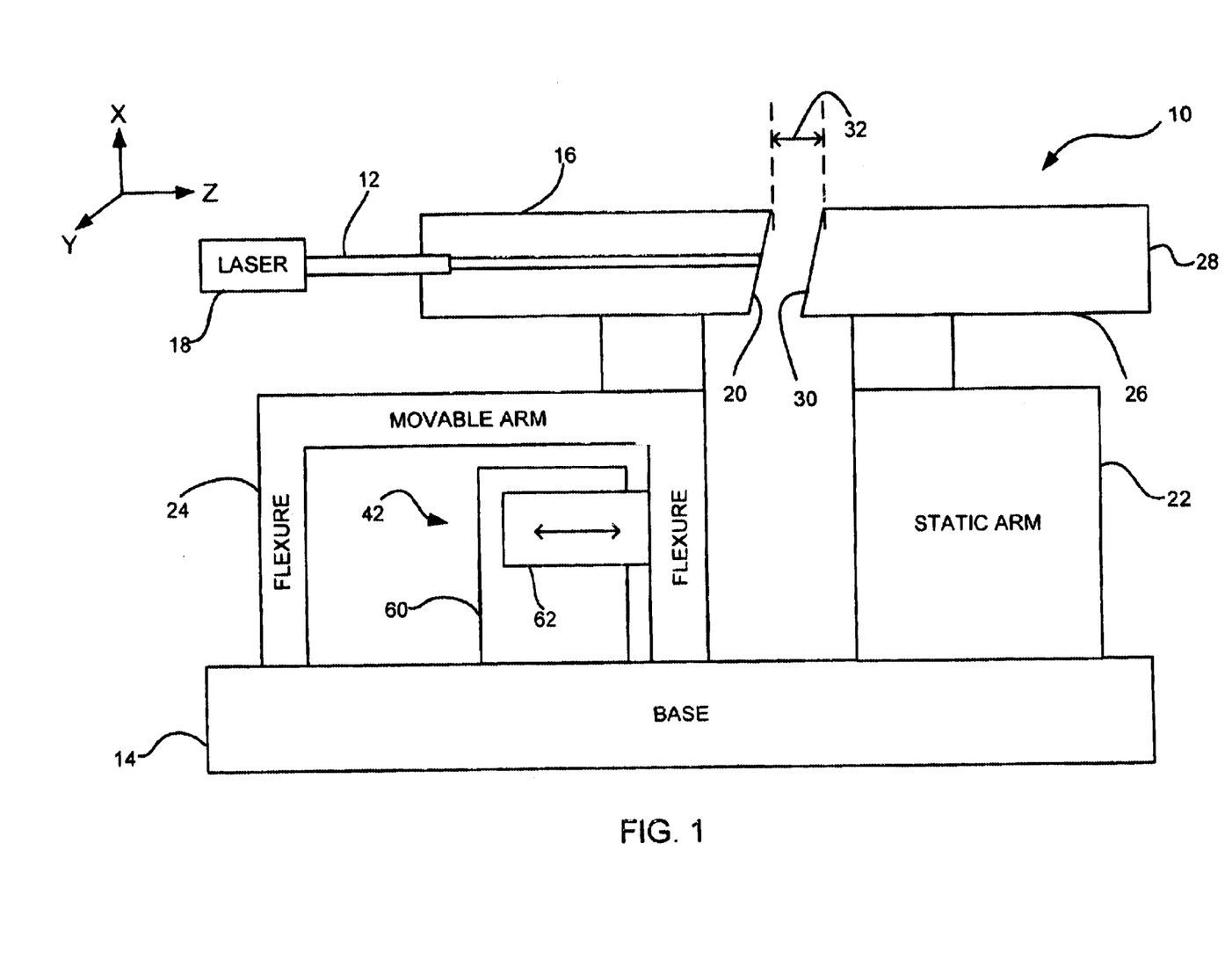
FIG. 1 is a schematic representation of an optical component assembly apparatus that uses the system and method of the present invention to measure gap width between polished surfaces.

Referring to FIG. 1, an optical component assembly 10 includes a base 14, a three-axis flexure (for simplicity, only a z-axis flexure 24 is shown in FIG. 1—flexure is also referred to as a moveable arm), and a static arm 22. Both the flexure 24 and the static arm 22 are attached to the base 14. The optical component assembly 10 includes an optical fiber 12 (typically with silica based core and cladding) inside a glass tube 16, and a GRIN lens 26. An end face 20 of the glass tube 16 (with the fiber 12 inside it) is ground and polished at a predetermined facet angle (for example 8°) to prevent back reflection along the optical axis. An end face 30 of the GRIN lens 26 is also ground and polished at the same predetermined facet angle. The GRIN lens 26 is shaped as a rod and has an index of refraction varying along its radius to act like a convex lens.

A separation, space or gap 32 between the end face 20 of the glass tube 16 and the end face 30 of the GRIN lens 26 is established by the system and method of the present invention. The actual dimension of the gap 32 varies widely for different optical components. However, for a given optical assembly the gap 32 is generally prescribed/predetermined in order to maximize the efficiency of the assembly. Further, the gap 32 can be filled with air, water, alcohol, glue and the like depending on the assembly of the particular optical component. After the assembly 10 is set-up, the assembly 10 can further be used to adjust a second end face 28 in respect to other components by using the same type of adjustment assembly 10 and the same system and method of the present invention.

The optical fiber 12 and the glass tube 16 are attached to the flexure 24, and the GRIN lens 26 is attached to the static arm 22 (note that the positions of the fiber/tube 16 and the GRIN lens 26 can be interchanged). The glass tube 16 (with the fiber 12 inside it) can be moved along the three axes (x, y and z) and its position can be adjusted relative to the GRIN lens 26. This allows the control of the gap 32 and the position of the fiber 12 inside the glass tube 16 relative to the GRIN lens 26. The flexure 24 is moved along the z-axis by means of a electromagnetic (EM) device 42, which includes a coil 62 and a permanent magnet 60 (for more details see FIG. 3A).

As shown in FIG. 1, the permanent magnet 60 is attached to the base 14, while the coil 62 is attached to the movable flexure 24. The locations and the attachment position of the permanent magnet 60 and the coils 62 can be interchanged. Similar flexures 24 with permanent magnet/coil mechanisms are used for the x- and y-axes. The flexures 24 are typically used for fine tuning. Coarse tuning can be done by a stepper motor 44 (see FIG. 2A) or micrometers (not shown) in x, y and z axes, independently. The micrometers have a step size of 5 or 10 $\mu$m and by sending current through the coil 62, the movement is of the order of 0.5 $\mu$m /milliamp of direct current.

A direct current (DC) can also be used to finely move the flexure 24. In a typical system, the dither along the x or y axis can measure the gap 32 along the z-axis and after that by switching the dither off and by sending a DC current from −30 to +30 milliamp of current the moving flexure 24 can be moved. This is useful in aligning optical devices for low insertion loss.

Figure 2A:
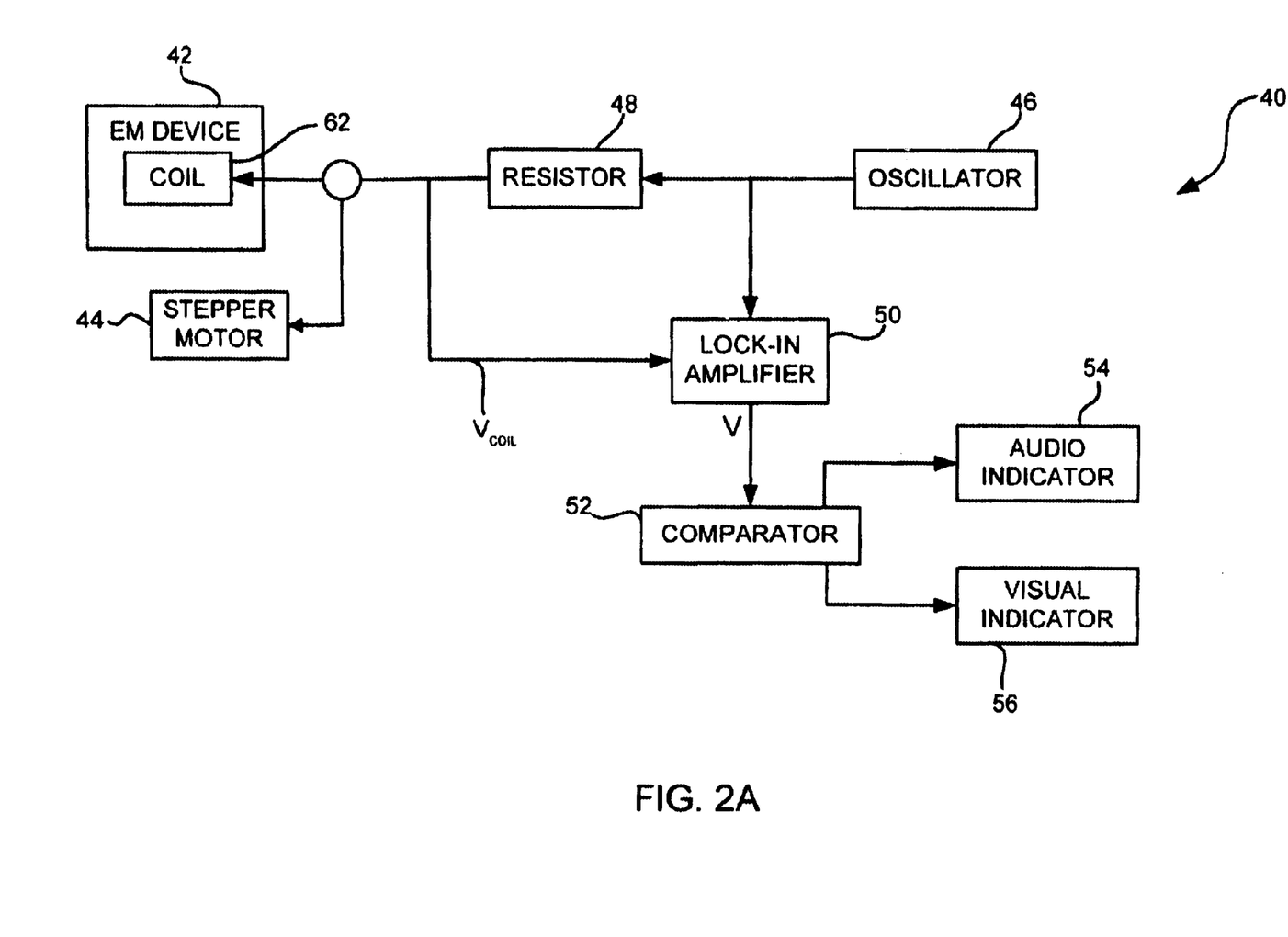
FIG. 2A is a block diagram showing a gap measuring and control system according to an embodiment of the present invention.

FIG. 2A shows a system 40 according to an embodiment of the present invention for limit sensing, maintaining and measuring the gap 32 between the glass tube 16 and the GRIN lens 26. A variable frequency sinusoidal oscillator 46, through a limiting resistor 48, excites the coil 62 with a voltage ($V_{coil}$). The coil 62 has a prescribed DC resistance of for example 132 Ohms. A lock-in amplifier 50, whose reference is derived from the oscillator 46, monitors the voltage across the coil 62.

The voltage ($V_{coil}$) across the coil 62 is a superposition of applied voltage across the coil 62 and generated or induced electromotive force (EMF) by the coil 62, since it is moving in the presence of a strong magnetic field. In general, EMF is the property of a source of electrical energy that causes a current to flow in a circuit. The algebraic sum of the potential differences in a circuit equals the EMF. The direction of the induced current opposes the very current applied to the coil. This is the direct consequence of Lenz's law.

An increase in the induced EMF is a result of an increase in mechanical vibration (maximum induced EMF is achieved at resonance). Output voltage (V) from the lock-in amplifier 50 is a measure of voltage of the coil 62. The output voltage (V) is passed to a comparator 52, which processing the output voltage (V) with ultimate gap indicator signals being passed to an audio indictor 54 (piezo buzzer) and/or a visual indicator 56 (Light Emitting Diode). These indications are primarily for alerting a user that the two optical surfaces touch or the gap 32 is zero. A stepper motor 44 (or micrometer) is used to back-off (or separate) the surfaces 20 and 30 after contact detection as discussed in more detail below.

Figure 2B:
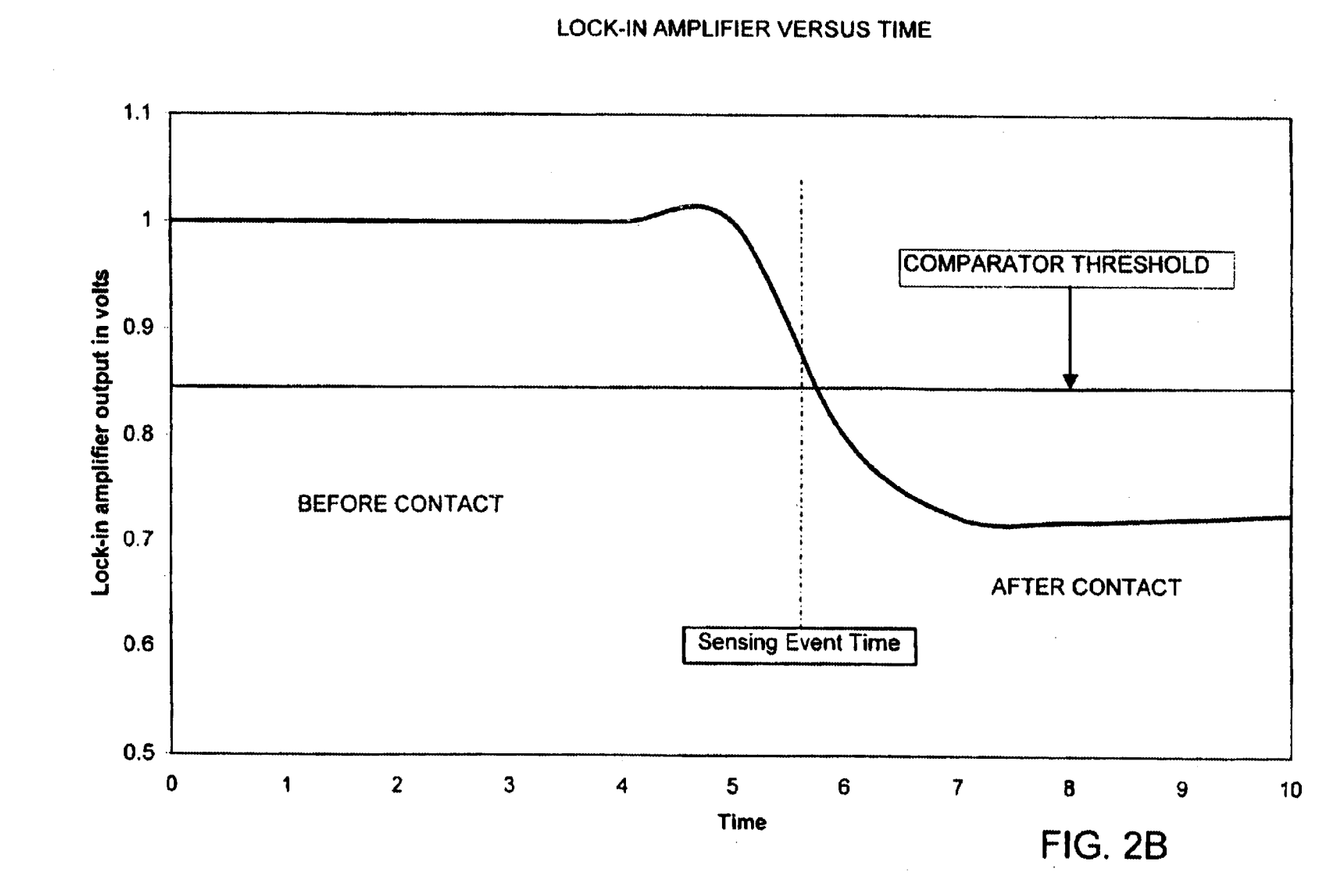
FIG. 2B is a graph showing output from the lock-in amplifier of FIG. 2A versus time.

In a manual operation, i.e., without the stepper motor 44, the indicators 54 and 56 provide a mechanism to give a contact warning and the surfaces 20 and 30 can be backed off a predetermined distance (i.e., the gap 32 is established suitable for the assembly 10, e.g., 10 or 20 $\mu$m). FIG. 2B provides a graph of the output of the lock-in amplifier 50 versus time. The slope between the "before contact" region and the "after contact" region is due to a time constant in the lock-in amplifier 50.

Figure 3A:
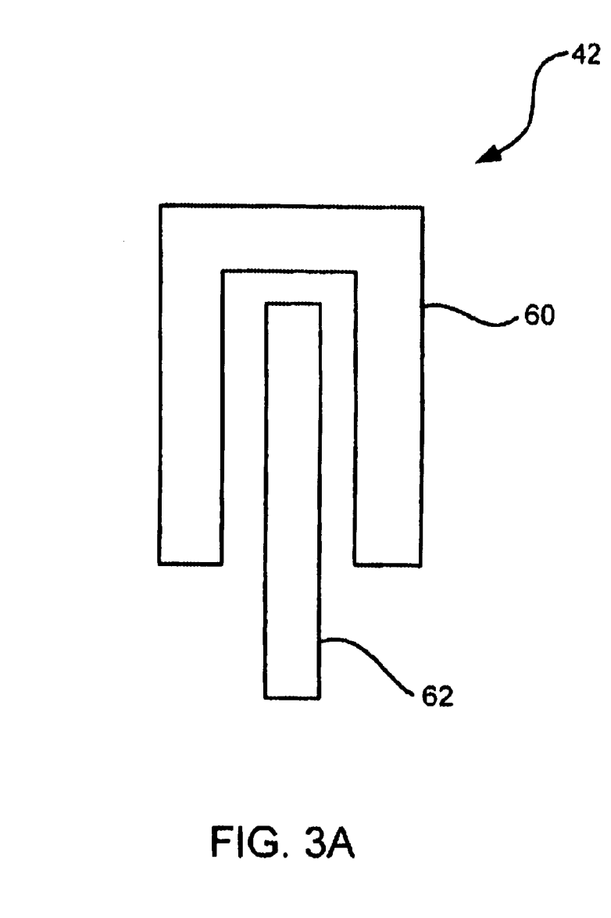
FIG. 3A is a schematic representation of the EM device shown in FIG. 2.
Figure 3B:
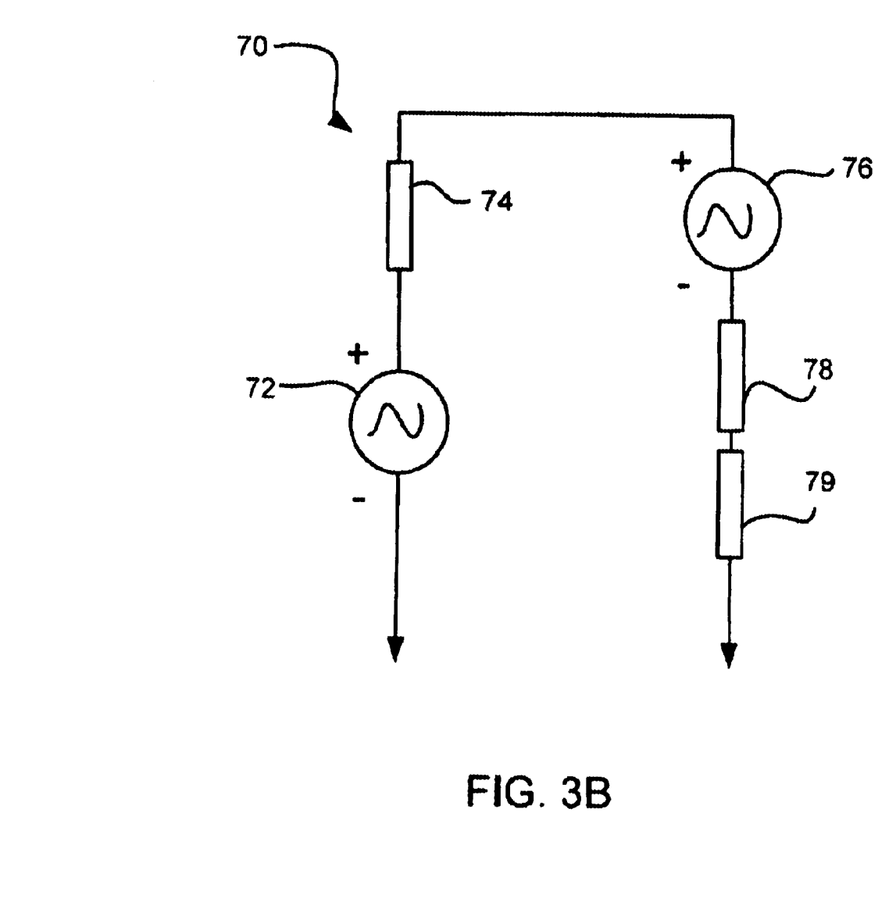
FIG. 3B is a circuit model of the EM device shown in FIG. 3A.

FIG. 3A is a schematic illustration of the EM device 42 in more detail according to an embodiment of the present invention. As also shown in FIG. 1, the EM device 42 includes the permanent magnet 60 and the wound coil 62. FIG. 3B represents an equivalent circuit model 70 of the EM device 42 of FIG. 3A. The circuit model 70 includes an applied voltage source 72 preceded by a resistor 74 that represents impressed current limiting resistance and an induced voltage source 76 followed by an inductor 78 and a resistor 79.

As the frequency, generated by the oscillator 46, is increased, the output voltage (V) reflects mechanical vibration of the flexure 24 along an axis and has resonance at a prescribed frequency (e.g., $f_R$=62 Hz), when the two surfaces 20 and 30 are not touching.

Figure 3C:
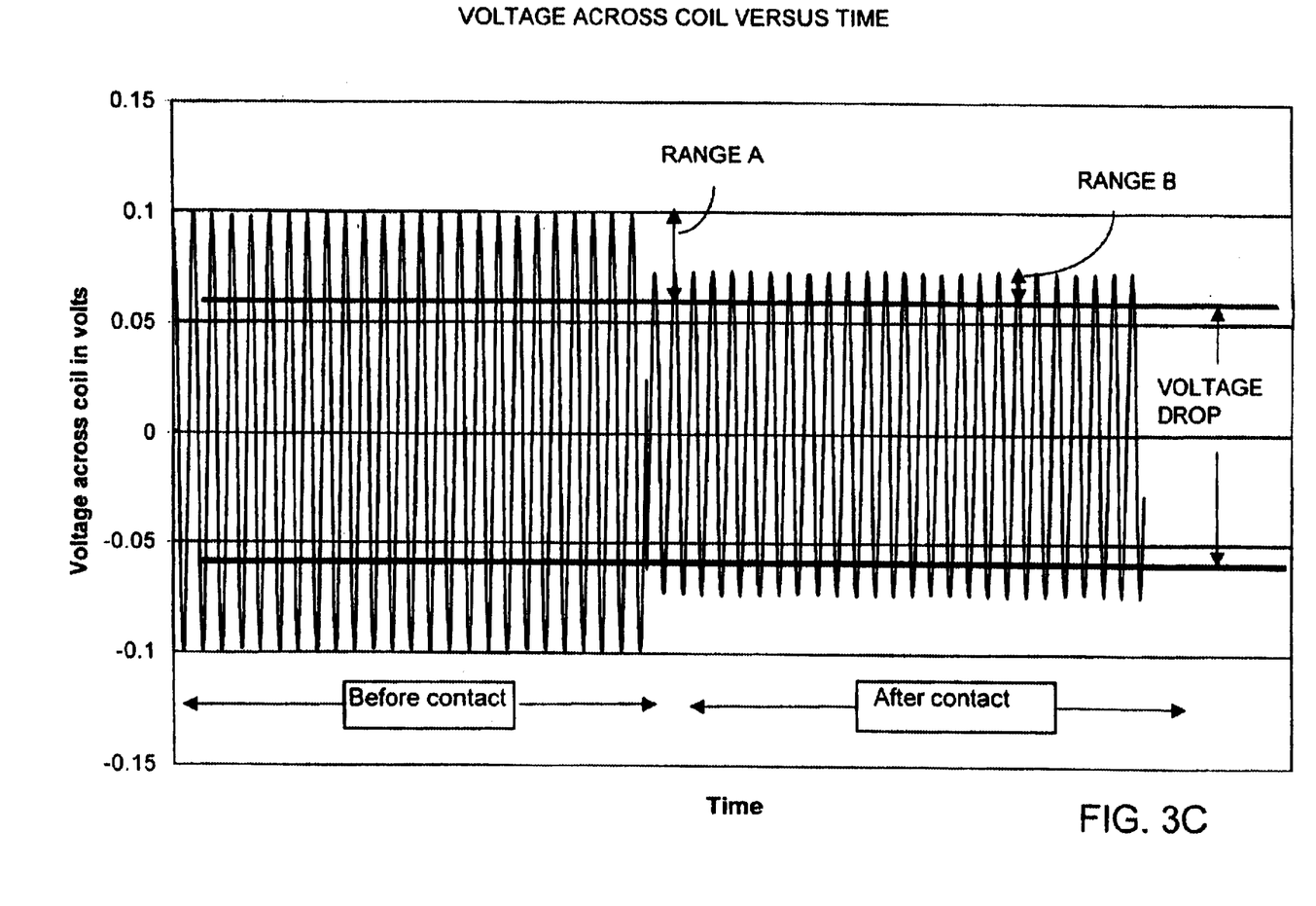
FIG. 3C is a time domain representation before and after contact of two surfaces.

Refer to the graph of FIG. 3C, induced voltage is proportional to mechanical dither. When the two surfaces (20, 30) are not touching each other and the mechanical system is in resonance, the moving arm/flexure 24 vibrates much more relative to being off resonance. By applying a small electrical sinusoidal current, the flexure 24 is dithered. Since, the induced current is proportional to the mechanical dither, this is used to indicate the resonance.

Figure 4:
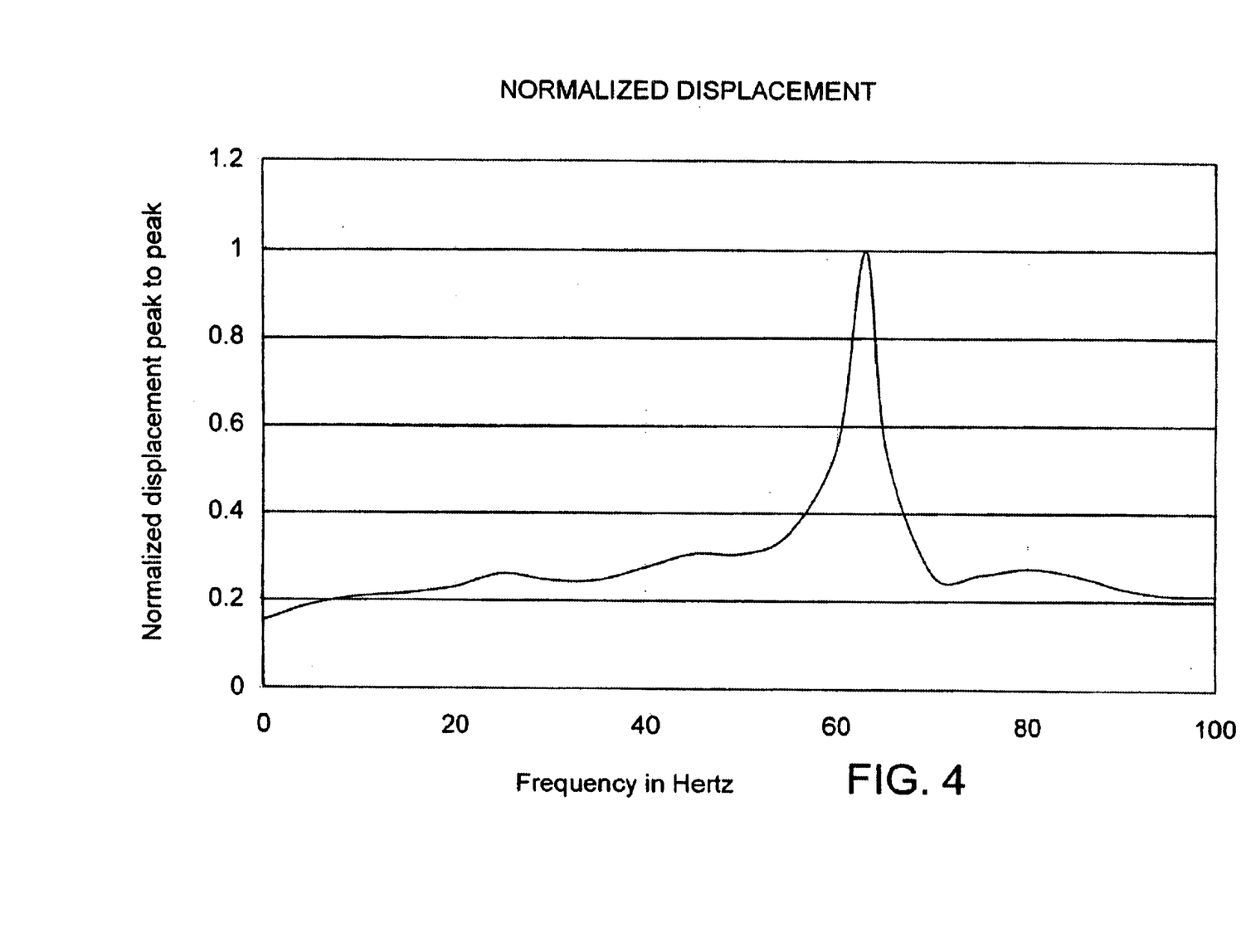
FIG. 4 is a graph showing the frequency response of the coil shown in FIG. 2A at various displacements.
Figure 5:
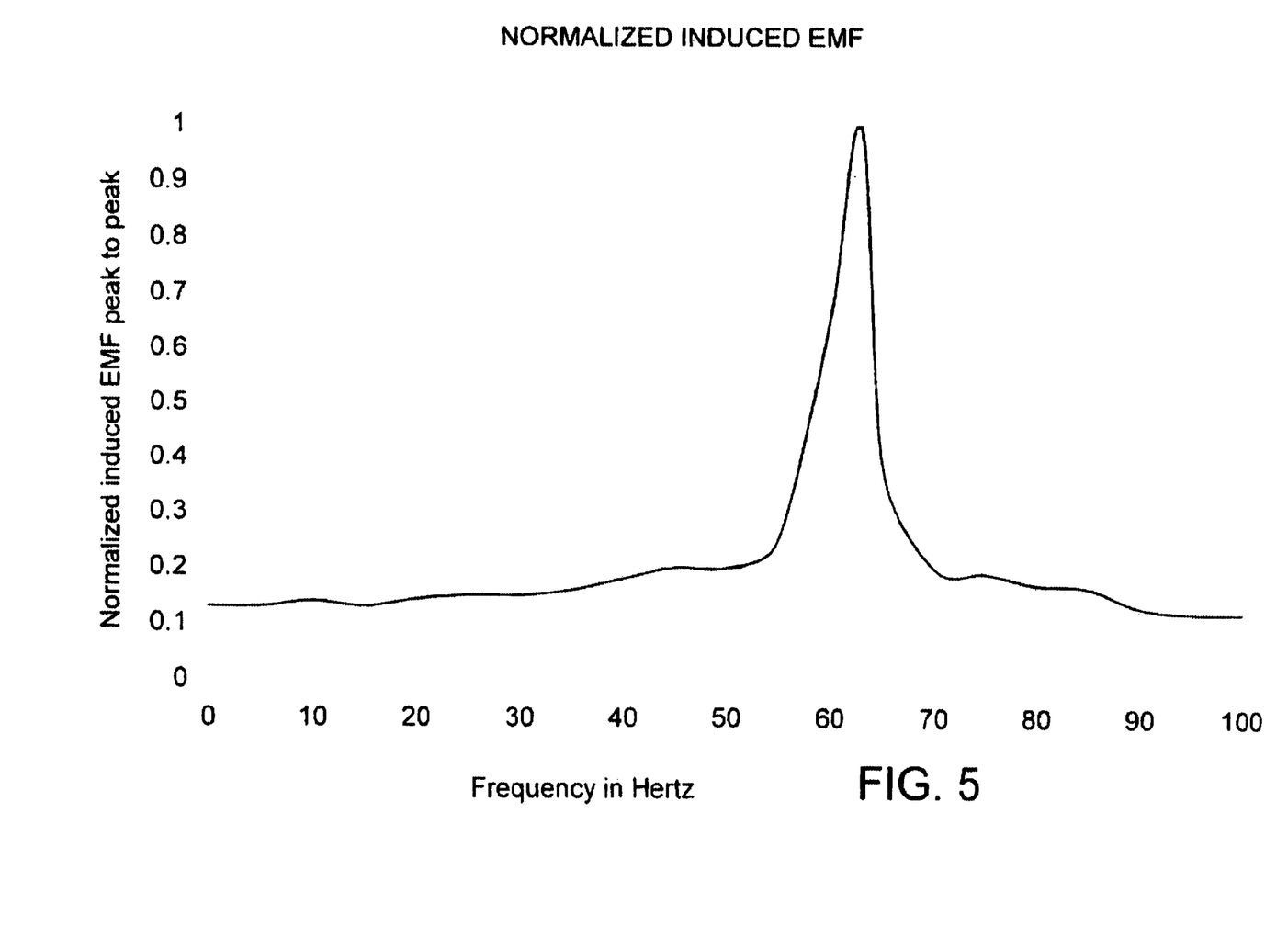
FIG. 5 is a graph showing the normalized induced EMF versus frequency.

In particular, when a freely oscillating mechanical system, at a given resonant frequency, is opposed by a force coming from touching or rubbing of the surfaces, the resonant frequency gets altered and for the same applied sinusoidal current, the mechanical dither reduces drastically. A factor of 6.5 is observed in a particular arrangement as shown in FIGS. 4 and 5. This factor is independent of applied sinusoidal current. Therefore, a mechanical dither of less than 1 micron will suffice, at resonance. When the two optical surfaces 20 and 30 touch, it further drops below 15%, which limits potential damage to the optical surfaces. Since the applied sinusoidal current is directly proportional to the mechanical dither, this touch condition is sensed with the system 40 as described. The resonant frequencies are less than 200 Hz for some exemplary assemblies 10 tested.

Therefore, the phase difference between the applied and induced currents is negligible. The applied voltage is multiplied before the current limiting resistor with the voltage across the coil 62 before filtering to read the voltage independent of ambient vibrations and EMI. The voltage output is directly proportional to the peak-to-peak voltage across the coil 62—it is sum of applied and induced voltages across the coil 62.

A resistor divider network includes the current limiting resistor 74 and the resistance of the coil 62. The voltage drop due to the resistance of the coil 62 is shown between the two horizontal lines in FIG. 3C. Since, there is no phase difference between applied and induced currents, due to low frequency sinusoidal excitation, the inductor of the coil 62 (of the order of a few tens of milli Henry), the coil 62 does not pose a sizeable reactive impedance. As a result, the phase difference between the applied and induced currents is approximately zero. Range A in FIG. 3C represents the induced voltage range before surface 20/30 contact. Range B in FIG. 3C represents the induced voltage range after surface 20/30 contact.

The behavior of the coil 62 is exploited based on the prescribed frequency information. The term "resonance" used in the present description is a mechanical phenomenon not electrical resonance since the system 40 does not include the necessary capacitance to resonate. When the two surfaces 20 and 30 touch each other (i.e., Z direction movement) additional load is exerted on the coil 62 and the resonant frequency is altered.

As the resonant frequency is altered the output voltage (V) drops significantly (e.g., as much as 30% as shown in FIG. 3C). The drop in the output voltage (V) is used to sense the gap 32 and the stepper motor 44 can be used back off (separate) the surfaces 20 and 30 accordingly (e.g., 10–20 microns, depending on application). When the surfaces 20 and 30 do not touch, the voltage of the coil 62 is not a function of Z-axis movement (controlled by the stepper motor 44).

The amplitude of the output voltage (V) per se is not considered, but rather is scalable since it is a measure of the allowable mechanical dither to prevent any possible unwanted rubbing between the two polished surfaces 20 and 30. For example, in an experimental arrangement it was shown that at resonance frequency it is possible to obtain 6.5 times more mechanical dither than at DC voltage equal to the peak-to-peak AC voltage (generated by the oscillator 46). FIG. 4 shows a graph of frequency response of the coil 62 at various frequencies using a video camera confirming the change in the induced EMF by the factor of 6.5.

The mechanical resonance is defined by equation (1).

$$2\pi f_R = \sqrt{\frac{k}{m}} \quad (1)$$

where k represents the spring constant of a flexure
m represents the mass of a vibrating body As the two polished surfaces 20 and 30 contact each other momentarily an additional force is applying in the opposite direction of movement. This results in a change of the resonance frequency $f_R$ and, correspondingly, a decrease of the mechanical vibration and the generated EMF. An example trace of normalized induced EMF due to the mechanical dither as a function of frequency is shown in FIG. 5.

Figure 6A:
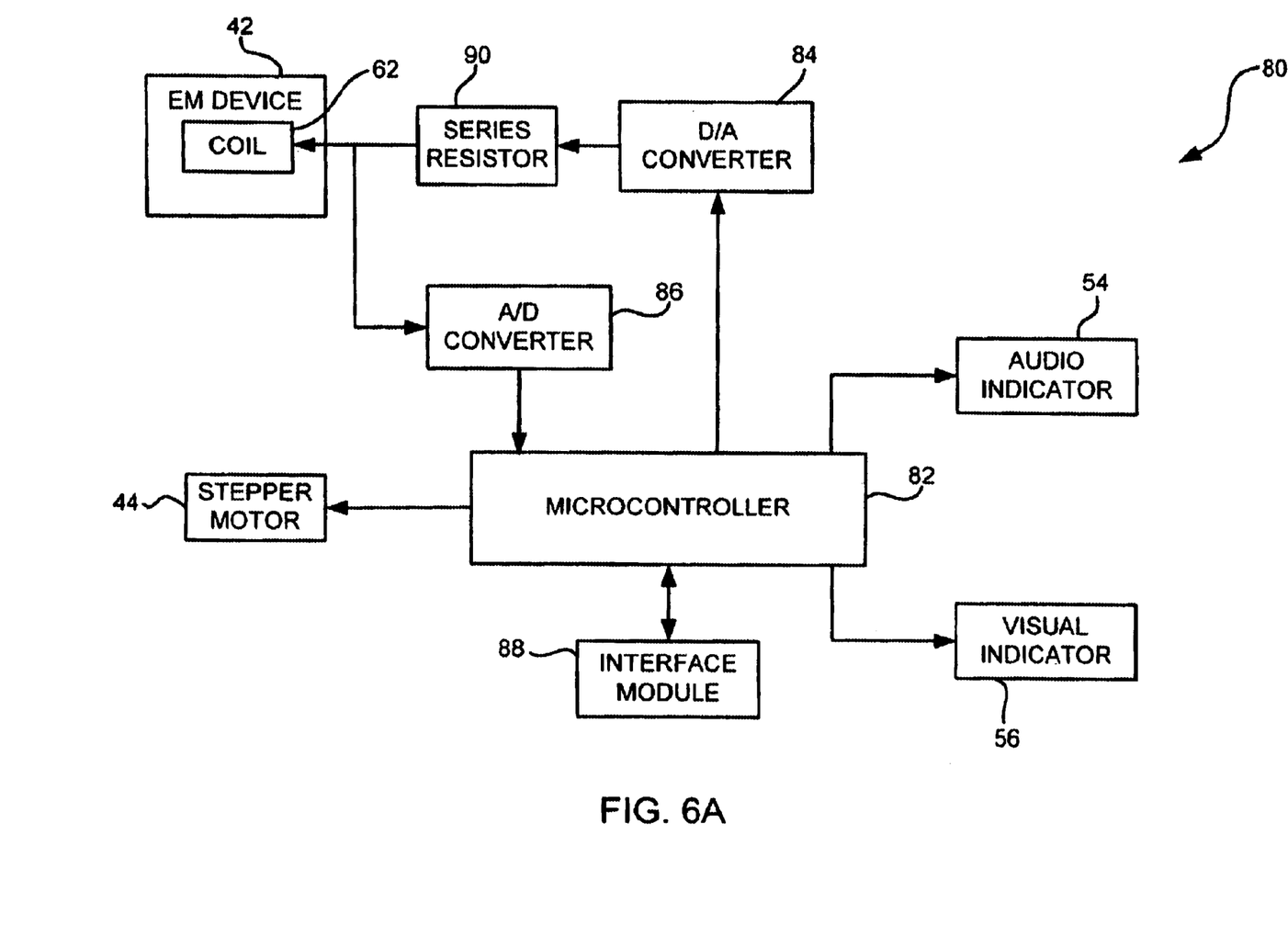
FIG. 6A is a block diagram shown a gap measuring and control system according to another embodiment of the present invention based on a microcontroller based implementation.

FIG. 6A shows a system 80 according to another embodiment of the present invention for limit sensing, maintaining and measuring the gap 32 between the glass tube 16 and the GRIN lens 26. The system 80 includes a microcontroller 82 that generates an output sinusoidal signal by a digital-to-analog (D/A) converter 84 to control the coil 62. Output from the D/A converter 84 is looped back to the microcontroller 82 through a series resistor module 90 to an analog-to-digital (A/D) converter 86. Upon multiplying the data sent to the D/A converter 84 and data read by the A/D converter 86 and low-pass filtering, lock-in detection is obtained.

The system 80 further includes an interface module 88 for managing GPIB (general purpose interface bus) and RS-232C interfaces to communicate to a computer (not shown). The system 80 also includes the stepper 44 and the audio 54 and visual 56 indicator modules as discussed previously. The resonant frequency $f_R$ is obtained adaptively by sweeping the frequency of the oscillator 46 (sinusoidal excitation) by monitoring the voltage across the coil 62.

The microprocessor/DSP based representation of the system of FIG. 2A is shown in FIG. 6A. The microcontroller 82 performs the multiple functions. The microcontroller 82 sends sinusoidal samples to the D/A converter 84. The D/A output voltage is used to send current across the coil 62 through a series resistor 90. The voltage across the coil 62 is a sum of applied voltages across the coil 62 (due to the coil's resistance) and induced EMF as the coil 62 is in presence of strong magnetic field from the permanent magnet 60. Firmware (code) in the microcontroller 82 manages lock-in detection and drives the stepper motor 44. The microcontroller 82 also interfaces with a computer (not shown) using the GPIB and RS-232C interfaces through the interface module 88 as discussed above. The computer can provide commands to move the stepper motor 44 and coils 62 (x, y, z axes).

In practice, the mechanical resonance frequencies vary for different optical component assemblies depending on the flexures, which act like springs. This effect is the same whether an X or Y coil is used. In various experiments, it has been determined that the mechanical resonance frequencies generally range from 60 to 200 Hz depending upon the geometry and stiffness of flexures made of aluminum.

Figure 6B:
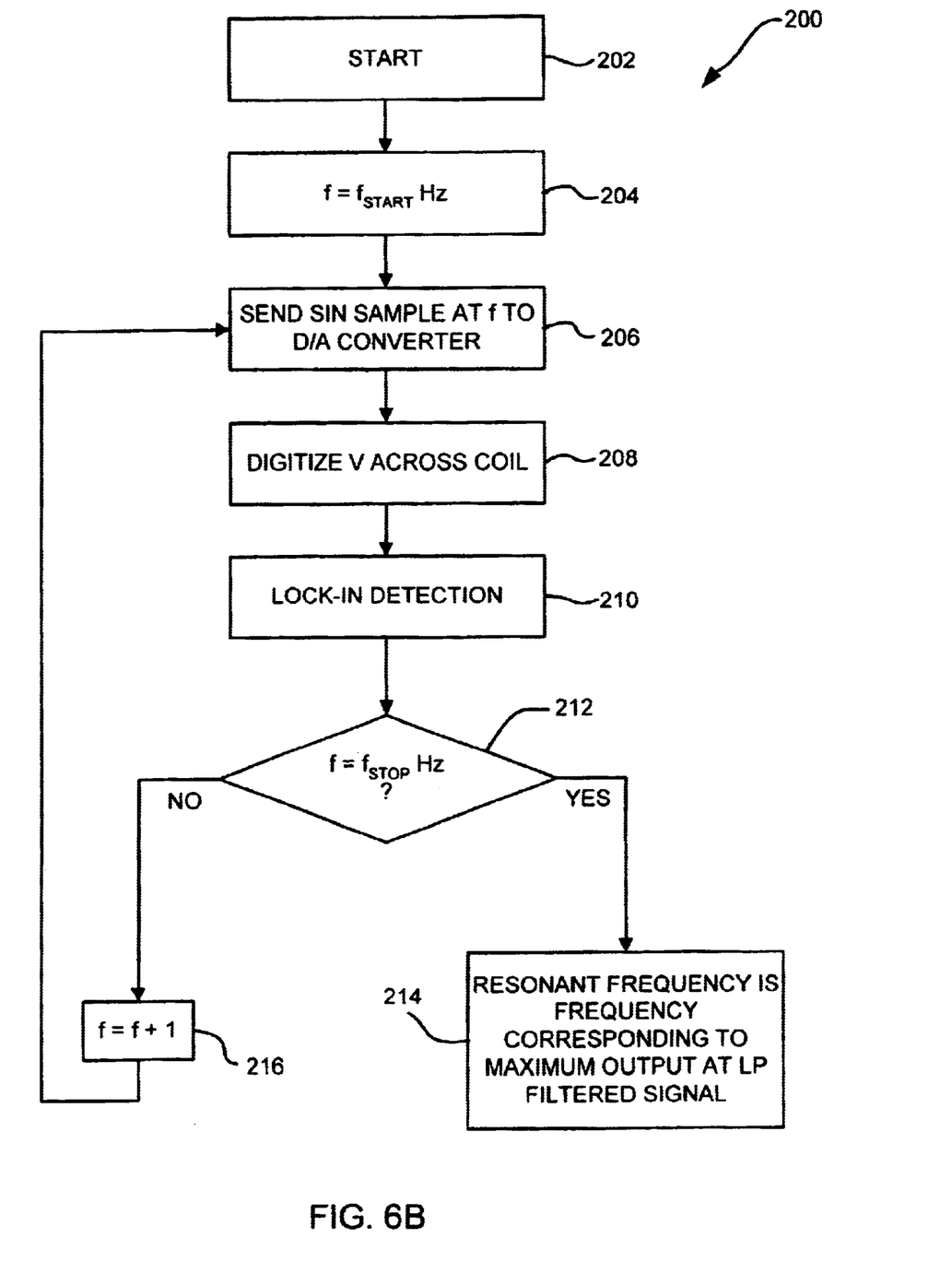
FIG. 6B is a flowchart to detect resonant frequency according to an embodiment of the present invention.

A method 200 according to the present invention, shown in FIG. 6B, is used to initially determine the resonance frequency $f_R$. Further, although the resonance frequency is generally stable, method 200 can be used when drift is detected. The resonance frequency $f_R$ does not generally change significantly for any given flexure 24. However, it is generally preferred to determine $f_R$, once the system is turned "ON" to locate frequencies $f_{START}$ to $f_{STOP}$ (working variables).

Referring to FIG. 6B:

Step 202: start process;

Step 204: choose the frequency of the sinusoidal input to the coil 62 to be f=$f_{START}$Hz;

Step 206: send the sinusoidal sample at f to the D/A converter 84;

Step 208: digitize the voltage across the coil and store;

Step 210: multiply the tone sample sent to the D/A converter 84 with the A/D sample and use the low-pass digital filtering on the multiplied output at the cut-off frequency of (for example 2 Hz) and store this filtered output; (i.e., lock-in detection implemented by firmware);

Step 212: if $f=f_{STOP}$ proceed to step 214, otherwise proceed to step 216;

Step 214: find the frequency corresponding to the maximum output at the low pass filtered signal (this is the resonant frequency $f_R$ ); and Step 216: set the frequency of the sinusoidal input to the coil 62 to be f=f+1 and return to step 206.

Figure 7:
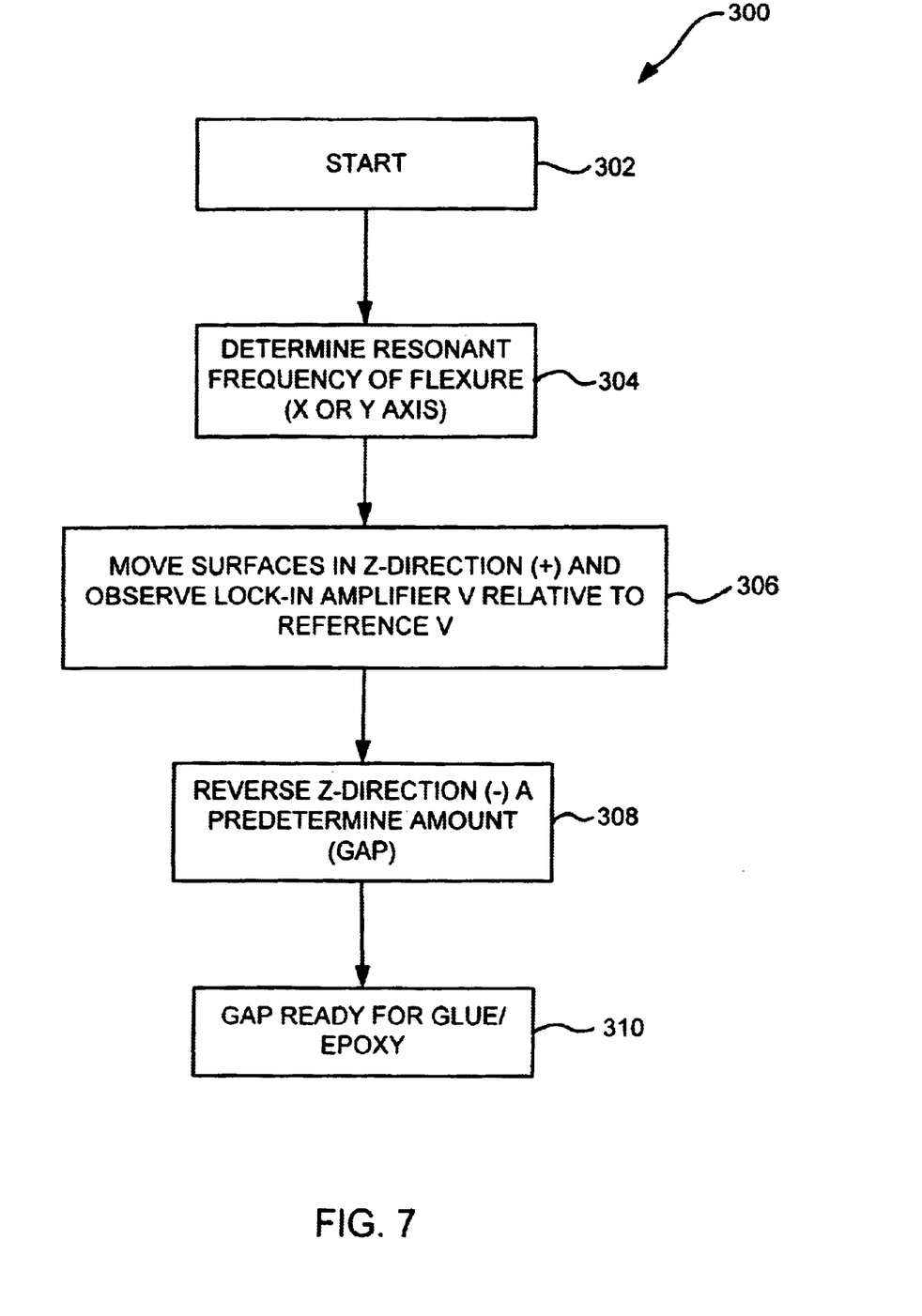
FIG. 7 is a flowchart illustrating a method of gap measurement according to the present invention.

FIG. 7 shows a flow chart illustrating a method 300 of limit sensing and gap maintenance used for the optical components shown in FIG. 1.

Step 302: start process;

Step 304: determine the resonant frequency of the flexure 24 either in the x or y axis by observing the lock-in amplifier output or using lock-in method 200;

Step 306: keep closing in the z-direction by manually moving the z-axis micrometer or using stepper motor driven micrometer and observing the lock-in amplifier output less than or equal to the reference voltage; and Steps 308 and 310: move the surfaces 20/30 (back off by say 10 or 20 micrometers depending on the application) in a direction opposite the closing direction, by moving the stepper 44 backwards to ensure the desired gap (308) for applying glue or epoxy (310) as required. As discussed above, steps 302–308 can also be performed after the gap 32 is filled with a material.

Although the invention has been described in terms of certain optical fibers, cylindrical ferrules, tubes, GRIN lenses, sleeves, materials, fixtures, and bonding techniques, it is appreciated that other existing and hereafter developed elements and techniques can be advantageously used with the present invention as dictated by the intended use of optical assemblies such as collimators. In particular, the present invention may be employed with optical assemblies having graded-index (GRIN) lenses, spherical or "ball" lenses, drum lenses, or an optical fiber lens and with a variety of passive or active optical elements, which may be described as interference filters, dichroic filters, thin-film filters, isolators, circulators, gain-flattening filters, band stripping filters, grating elements, reflective elements, refractive elements, diffractive elements or liquid-crystal elements.

While the invention has been described and illustrated in connection with preferred embodiments it is to be understood that the subject matter herein is not to be limited to those specific embodiments. On the contrary, it is intended for the subject matter of the invention to include all alternatives, modifications and equivalents as can be included within the spirit and fall scope of the following claims.

What is claimed is:

1. A method for controlling a relative movement between faces of first and second optical components, one end face of the first optical component being faced with one end face of the second optical component, the method comprising the steps of:

providing first attaching means, the first optical component being attached to the first attaching means;

providing second attaching means, the second optical component being attached to the second attaching means, the first and second optical components attached to the respective attaching means, one of the first and second attaching means being movable in a direction to define a gap between the two faces;

providing an electromotive force (EMF) to cause the two optical components to move relatively to each other in the direction, so that the faces of the two optical components are in proximity; and detecting contact between portions of the faces of the two optical components, wherein the EMF is provided by means of AC oscillation voltage so that the EMF vibrates the movable attaching means mechanically at a mechanical resonance.

2. The method of claim 1, further comprising preventing the two optical components from relatively moving in the direction, in response to the detection of contact between portions of the faces.

3. The method of claim 2, wherein the step of providing first attaching means comprises the step of providing a non-movable body to which the first optical component is attached.

4. The method of claim 3, wherein the step of providing second attaching means comprises the step of providing a movable body to which the second optical component is attached, the movable body being caused to be moved due to the EMF, so that the two optical components relatively move in the direction.

5. The method of claim 4, further comprising the steps of:

providing an optical collimator component as the first optical component, the collimator component being attached to the non-movable body; and providing an optical fiber as the second optical component, the fiber being attached to the movable body, the optical fiber transmitting light there through, the light being emitted from an end face of the fiber to a face of the collimator component, wherein upon the movement of the non-movable body in the direction due to the EMF, the faces of the collimator component and the fiber are in proximity.

6. The method of claim 5, wherein the step of providing an optical fiber includes the step of providing an elongated tube, the fiber being contained in the tube, the collimator component being oriented at an axis of the tube, the direction of the movement of the fiber being the axis of the tube, so that fiber and the collimator component are aligned.

7. The method of claim 4, further comprising the step of providing an EMF device to the movable body.

8. The method of claim 7, wherein the step of providing an EMF device includes the step of providing a magnet and a coil, the magnet generating a magnetic field resulting from a current flowing in the coil, the reaction of the magnet with the magnetic field creating the EMF.

9. The method of claim 8, wherein the step of providing a magnet and a coil includes providing a permanent magnet mounted to the movable body, the reaction of the permanent magnet with the magnetic field resulted from a current flowing in the coil creating the EMF, so that the second optical component attached to the movable body moves in the direction.

10. The method of claim 9, further comprising the step of providing a movable arm holding the fiber attached to the movable body.

11. The method of claim 10, further comprising the step of providing the AC oscillation voltage to the coil whereby an AC current flows in the coil, so that the EMF vibrates the movable arm mechanically at a mechanical resonance.

12. The method of claim 1 wherein the step of detecting contact includes the step of detecting contact at a frequency of the mechanical resonance.

13. The method of claim 12, wherein the step of detecting contact further includes detecting a change to a vibration of the movable attaching means when the faces of the two optical components touch each other.

14. The method of claim 9, wherein the step of detecting a change includes the steps of:
   obtaining a first AC voltage in response to the AC oscillation voltage;
   obtaining a second AC voltage induced from the current flowing in the coil; and
   processing the first and second AC voltages with reference to their electrical parameters to detect contact of portions of the faces of the two optical components.

15. The method of claim 14, further comprising the steps of:
   controlling the movement of the movable body by a moving means; and
   further controlling the movement of the movable body in response to the detection of contact of portions of the faces of the two optical components.

16. The method of claim 14, further comprising the step of providing an audio and visual indication of the detection of contact of portions of the faces of the two optical components.

17. The method of claim 11, further comprising the step of digitally detecting the frequency of the mechanical resonance of the moveable arm.

18. The method of claim 17, wherein the step of digitally detecting includes the steps of:
   providing a first digital data;
   providing an analog signal to the coil with reference to the first digital data, a current flowing in the coil in response to the analog signal;
   obtaining an induced analog voltage resulting from the flowing of the current in the coil;
   converting the induced analog voltage to a second digital data; and
   processing the first and second digital data to detect the frequency of the mechanical resonance with reference to the first and second digital data.

19. The method of claim 18, wherein:
   the step of providing a first digital data includes the step of selecting a frequency of an sinusoidal input to the coil, the first digital data containing information of the selected frequency;
   the step of converting includes the step of digitizing the induced analog voltage, the second digital data containing frequency information of a digitized voltage; and
   the step of the processing includes the steps of:
      (i) comparing the chosen frequency information of the first digital data and the frequency information of the second digital data; and
      (ii) in a case where a predetermined condition with the both frequencies is met, providing a new first digital data containing information of a newly selected frequency.

20. A system for controlling a relative movement between faces of first and second optical components, one end face of the first optical component being faced with one end face of the second optical component, the system comprising:
   a first attachment body for attaching the first optical component thereto;
   a second attachment body for attaching the second optical component thereto, the first and second optical components attached to the respective attachment bodies, one of the first and second attachment bodies being movable in a direction to define a gap between the two faces;
   an electromotive force (EMF) device for providing an EMF to cause the two optical components to move relatively to each other in the direction, so that the faces of the two optical components are in proximity;
   means for detecting contact between portions of the faces of the two optical components; and
   means for providing an AC oscillation voltage to the EMF device so that the EMF vibrates the movable attachment body mechanically at a mechanical resonance.

21. The system of claim 20, further comprising means for preventing the two optical components from relatively moving in the direction in response to the detection of contact between portions of the faces of the two optical components.

22. The system of claim 20, wherein the first attachment body includes a non-movable arm and the second attachment body includes a movable arm operable in the direction in response to the EMF provided by the EMF device, the two optical components relatively moving in the direction.

23. The system of claim 22, wherein the first optical component includes an optical collimator and the second optical component includes an optical fiber, the optical fiber being attached to the movable arm, the optical fiber transmitting light there through, the light being emitted from an end face of the optical fiber to a face of the collimator component, wherein upon the movement of the non-movable arm in the direction due to the EMF, the faces of the collimator component and the optical fiber are in proximity.

24. The system of claim 23, further comprising an elongated tube, wherein:
   the fiber is contained in the tube;
   the collimator component oriented at an axis of the tube; and
   the direction of the movement of the fiber being the axis of the tube, so that fiber and the collimator component are aligned.

25. The system of claim 23, wherein the collimator component includes a graded index lens.

26. The system of claim 24, wherein the tube comprises a glass tube that holds an exposed end of the optical fiber.

27. The system of claim 22, wherein the EMF device is attached to the movable arm and includes a magnet and a coil, the magnet generating a magnetic field resulting from a current flowing in the coil, the reaction of the magnet with the magnetic field creating the EMF.

28. The system of claim 27, wherein the magnet includes a permanent magnet mounted to the movable arm, the reaction of the permanent magnet with the magnetic field resulted from a current flowing in the coil creating the EMF, so that the second optical component attached to the movable arm moves in the direction.

29. The system of claim 28, further comprising means for providing the AC oscillation voltage to the coil, whereby an AC current flows in the coil, so that the EMF vibrates the movable arm mechanically at a mechanical resonance.

30. The system of claim 29, wherein contact is detected at a resonant frequency of the mechanical resonance of the vibrating movable arm, the resonant frequency being varied when the faces of the two optical components touch each other.

31. The system of claim 30, wherein the change of the resonant frequency is detected in response to the AC oscillation voltage and an induced AC voltage from the current flowing in the coil, so that from the detection of the resonant frequency change, contact of portions of the faces of the two optical components is detected.

32. The system of claim 31, further comprising a moving means for controlling the movement of the movable arm, the movement of the movable arm being further controlled in response to the detection of contact of portions of the two faces of the two optical components.

33. The system of claim 31, further comprising an audio and visual indicator for indicating the detection of the contact of portions of the faces of the two optical components.

34. The system of claim 29, further comprising
   (i) means for providing a first digital data;
   (ii) means for providing an analog signal to the coil with reference to the first digital data, a current flowing in the coil in response to the analog signal;
   (iii) means for obtaining an induced analog voltage resulting from the flowing of the current in the coil;
   (iv) means for converting the induced analog voltage to a second digital data;
   (v) means for processing the first and second digital data to detect the resonant frequency with reference to the first and second digital data.

35. The system of claim 34, wherein:
   the first digital data includes information of a selected frequency of an sinusoidal input to the coil; and
   the second digital data includes frequency information of a digitized voltage derived from the induced analog voltage, the selected frequency of the first digital data and the frequency information of the second digital data being compared, so that in a case where a predetermined condition with the both frequencies is met, a new first digital data containing information of a further selected frequency is provided to perform a new detection of the resonant frequency.

36. The method of claim 1 further comprising the step of separating the faces of the two optical components a predetermined amount after detecting the contact.

37. The system of claim 20 further comprising means for separating the faces of the two optical components a predetermined amount.

* * * * *

UNITED STATES PATENT AND TRADEMARK OFFICE
CERTIFICATE OF CORRECTION

PATENT NO. : 6,625,002 B2
DATED : September 23, 2003
INVENTOR(S) : Ramakrishnan et al.

Page 1 of 1

It is certified that error appears in the above-identified patent and that said Letters Patent is hereby corrected as shown below:

<u>Column 10,</u>
Lines 56 to 58, beginning with "10. The method of claim 9, further comprising...." to and including "...attached to the movable body." should read
-- 10. The method of claim 9 wherein the second component is an optical fiber, the method further comprising the step of providing a movable arm holding the fiber attached to the movable body. --

Signed and Sealed this

Twenty-seventh Day of April, 2004

JON W. DUDAS
*Acting Director of the United States Patent and Trademark Office*